US012570779B2

(12) United States Patent
Park et al.

(10) Patent No.: US 12,570,779 B2
(45) Date of Patent: Mar. 10, 2026

(54) DISPERSION STABILIZER BASED ON AT LEAST TWO TYPES OF POLYOLS AND METHOD OF PREPARING THE SAME

(71) Applicant: KOREA KUMHO PETROCHEMICAL CO., LTD., Seoul (KR)

(72) Inventors: Jinwoo Park, Seoul (KR); Gi Jung Kim, Seoul (KR); Seulgi Kim, Seoul (KR); Jae Yeong Song, Seoul (KR)

(73) Assignee: KOREA KUMHO PETROCHEMICAL CO., LTD., Seoul (KR)

( * ) Notice: Subject to any disclaimer, the term of this patent is extended or adjusted under 35 U.S.C. 154(b) by 509 days.

(21) Appl. No.: 18/331,593

(22) Filed: Jun. 8, 2023

(65) Prior Publication Data

US 2024/0034821 A1 Feb. 1, 2024

(30) Foreign Application Priority Data

Jul. 29, 2022 (KR) ........................ 10-2022-0094468
Aug. 8, 2022 (KR) ........................ 10-2022-0098411

(51) Int. Cl.
| | |
|---|---|
| *C08F 212/10* | (2006.01) |
| *C08G 18/62* | (2006.01) |
| *C08G 18/63* | (2006.01) |
| *C08G 18/76* | (2006.01) |
| *C08J 9/12* | (2006.01) |

(52) U.S. Cl.
CPC ........ *C08F 212/10* (2013.01); *C08G 18/6262* (2013.01); *C08G 18/7671* (2013.01); *C08J 9/125* (2013.01); *C08F 2800/20* (2013.01);
*C08G 2110/0008* (2021.01); *C08G 2110/0058* (2021.01); *C08G 2110/0083* (2021.01); *C08J 2203/10* (2013.01); *C08J 2205/06* (2013.01); *C08J 2375/04* (2013.01)

(58) Field of Classification Search
None
See application file for complete search history.

(56) References Cited

U.S. PATENT DOCUMENTS

| | | | | |
|---|---|---|---|---|
| 4,690,956 | A | * | 9/1987 | Ramlow .............. C08G 63/676 |
| | | | | 521/137 |
| 4,997,857 | A | * | 3/1991 | Timberlake ........... C08F 283/06 |
| | | | | 428/323 |

FOREIGN PATENT DOCUMENTS

| | | | | | |
|---|---|---|---|---|---|
| CN | 111057193 | A | * | 4/2020 | ................ C08F 2/38 |
| JP | S63-146912 | A | | 6/1988 | |
| KR | 10-2009-0091113 | A | | 8/2009 | |

* cited by examiner

*Primary Examiner* — Ha S Nguyen
(74) *Attorney, Agent, or Firm* — Studebaker Brackett PLLC

(57) ABSTRACT

Provided are a polymer polyol dispersion stabilizer, which is prepared by reacting a first polyol having a hydroxyl value (OHV) of 5 to 50 mgKOH/g and an ethylene oxide content of less than 20 wt %, a second polyol having an OHV of 50 to 100 mgKOH/g and an ethylene oxide content of 20 wt % or more, and a reactive unsaturated compound having one or more carbon-carbon double bonds and two or more carbon-oxygen double bonds, and a method of preparing the same.

10 Claims, No Drawings

DISPERSION STABILIZER BASED ON AT LEAST TWO TYPES OF POLYOLS AND METHOD OF PREPARING THE SAME

CROSS-REFERENCE TO RELATED APPLICATION

This application claims benefit of priority from the prior Korean Patent Application No. 10-2022-0094468, filed on Jul. 29, 2022, and the prior Korean Patent Application No. 10-2022-0098411, filed on Aug. 8, 2022, the disclosures of which are incorporated herein by reference in its entirety.

BACKGROUND

1. Field of the Invention

The present invention relates to a dispersion stabilizer into which two or more types of polyols are introduced to prepare a polymer polyol, a method of preparing the same, and an effect of the same.

2. Discussion of Related Art

A polymer polyol (POP) is also called a copolymer polyol (CPP) and is generally used to reinforce the hardness and air-permeability of polyurethane. Recently, as the amount of polyurethane used in an automobile seat and furniture increases, a demand for a high-solid-content POP with an excellent effect of strengthening polyurethane hardness even with a small amount is also increasing.

Generally, a polymer polyol is prepared by dispersing a vinyl-based polymer in a base polyol. When the content of a vinyl-based polymer corresponding to solid contents increases, it is known that the physical properties of the final product are improved. However, when the content of the solid contents is high, aggregation between polymers occurs and a viscosity increases, reducing the quality of urethane foam. When a polymer polyol with high viscosity is used, miscibility with another base polyol or additive is insufficient, and a flowability problem in molds may occur. In addition, it is sensitive to a viscosity change according to temperature, so it cannot be used depending on a region and a season.

To improve such disadvantage, a method of using a dispersion stabilizer that suppresses aggregation between polymer particles has been proposed. A macromer in which a graft site capable of binding to a vinyl-based polymer is imparted to a polyol chain with a certain size is a dispersion stabilizer that is commercially and widely used. A polyol-based macromer is known to make stable particle dispersion due to radical polymerization and have excellent miscibility with a base polymer even when including a different monomer difficult to make a chain transfer reaction.

Such a macromer is prepared by applying polymer particles and generally a tri-valent or higher high-functional polyol for improving grafting efficiency and a dispersion stabilizing effect. However, the macromer to which a high-functional polyol is applied has high viscosity due to the rigidity of a high-functional chain structure making a coupling reaction in preparation, and low workability and quality of the final product due to low linearity. Therefore, a separate linearity reinforcement process is needed. On the other hand, a macromer using a polyol having less functional groups has high linearity, but has low bonding strength with polymer particles, making it difficult to improve dispersion stability.

SUMMARY OF THE INVENTION

The present invention is directed to providing a polymer polyol dispersion stabilizer having a low viscosity and excellent dispersion stability.

According to one aspect, the present invention provides a polymer polyol dispersion stabilizer, which is prepared by reacting a first polyol having a hydroxyl value (OH-value; OHV) of 5 to 50 mgKOH/g and an ethylene oxide content of less than 20 wt %; a second polyol having an OHV of 50 to 100 mgKOH/g and an ethylene oxide content of 20 wt % or more; and a reactive unsaturated compound having one or more carbon-carbon double bonds and two or more carbon-oxygen double bonds.

In one embodiment, the difference in OHV between the first polyol and the second polyol may be 5 mgKOH/g or more.

In one embodiment, the difference in ethylene oxide content between the first polyol and the second polyol may be 10 wt % or more.

In one embodiment, the reactive unsaturated compound may be one or more selected from the group consisting of maleic acid, fumaric acid, maleic anhydride, itaconic acid, citraconic acid, and citraconic anhydride.

In one embodiment, the dispersion stabilizer may have a viscosity (at 25° C.) of 2,500 to 7,500 cps.

According to another aspect, the present invention provides a polymer polyol, which includes the above-described polymer polyol dispersion stabilizer; a polymer derived from an ethylenically unsaturated monomer; and a base polyol.

In one embodiment, the ethylenically unsaturated monomer may be at least one selected from the group consisting of an aromatic vinyl monomer and a vinyl cyan-based monomer.

In one embodiment, the content of solid contents may be 10 to 70 wt %.

In one embodiment, the viscosity (at 25° C.) may be 500 to 25,000 cps.

According to still another aspect, the present invention provides a method of preparing a polymer polyol, which includes: (a) preparing a first mixture by mixing the above-described polymer polyol dispersion stabilizer, an ethylenically unsaturated monomer, an initiator, and a base polyol; (b) preparing a second mixture by mixing a base polyol and a diluent; and (c) adding the first mixture to the second mixture and polymerizing the resulting mixture.

DETAILED DESCRIPTION OF EXEMPLARY EMBODIMENTS

Hereinafter, one aspect in the specification will be described. However, the descriptions in the specification may be implemented in different forms, and thus are not limited to examples to be described below.

Throughout the specification, when a part is "connected" with another part, it means that the one part is "directly connected", or "indirectly connected" with a third member therebetween. In addition, when a certain part "includes" a certain component, it means that, unless particularly stated otherwise, another component may be further included, rather than excluding the other component.

When ranges of numerical values are set forth herein, unless the specific range is stated otherwise, the values have precision of significant figures provided in accordance with the standard rule in chemistry for significant figures. For example, the number 10 includes the range of 5.0 to 14.9, and the number 10.0 includes the range of 9.50 to 10.49.

The "polymer polyol (POP)" used herein is also called a copolymer polyol and a product in which a particulated organic/inorganic filler is dispersed in a liquid base polyol at a predetermined content. The polymer polyol also includes a polyol in which polymer particles are polymerized and dispersed in a polyether polyol.

The "polyurethane" is a polymer material having a large amount of urethane (—NHCOO) bonds, and is used by being formed and processed in the form of a foam, which is a honeycomb-shaped light material generally through a polymer reaction that generates bubbles. The "polyurethane foam" is usually divided into flexible foam, rigid foam, or semi-rigid foam.

The "dispersion polymerization" is one of the methods of polymerizing a polymer, which is to obtain a product in which all components are dissolved in a single phase in the early stage of a reaction using a solvent, which is soluble to a monomer or insoluble to a produced polymer, a polymerization stabilizer and a polymerization initiator, but a product polymer is precipitated as polymerization progresses, and a particle diameter is in the range of hundreds of nanometers to tens of microns due to the polymerization stabilizer.

The "hydroxyl value (OH-Value, OHV)" refers to a hydroxyl number and the weight (mg) of potassium hydroxide (KOH) equivalent to OH groups present in 1 g of a polyol, and may be expressed in the unit mgKOH/g. Such OHV may be measured by various methods. For example, the OHV may be analyzed by near-infrared (NIR) spectroscopy. This analysis may be performed according to ASTM D6342 or ISO 15063.

Polymer Polyol Dispersion Stabilizer

A polymer polyol dispersion stabilizer according to one aspect may be prepared by reacting a first polyol having an OHV of 5 to 50 mgKOH/g and an ethylene oxide content of 20 wt % or less; a second polyol having an OHV of 50 to 100 mgKOH/g and an ethylene oxide content of 20 wt % or more; and a reactive unsaturated compound having one or more carbon-carbon double bonds and two or more carbon-oxygen double bonds.

In another example, the polymer polyol dispersion stabilizer may further include another compound, other than the first polyol, the second polyol, and the reactive unsaturated compound, but the present invention is not limited thereto.

The polymer polyol dispersion stabilizer may be a macromer-type dispersion stabilizer to which a graft site capable of binding to a polymer dispersed in a polymer polyol is imparted. The dispersion stabilizer may include a double bond that has a graft reaction with a vinyl-based monomer. As a result, aggregation between polymer particles may be inhibited.

The polymer polyol dispersion stabilizer may be prepared using two types of polyols, which have different OHVs and ethylene oxide contents. The dispersion stabilizer may have a low viscosity and improve the dispersion stability of polymer particles in a polymer polyol. By using the dispersion stabilizer, a polymer polyol which has a low viscosity and a high content of solid contents may be prepared.

The ethylene oxide content of the polyol may refer to a ratio of an ethylene oxide compound added in the synthesis of each polyol. The polyol may be a polyether polyol prepared by adding ethylene oxide and propylene oxide to an initiator with two or more activated hydrogens (—OH, —NH₂), but the present invention is not limited thereto.

When the ethylene oxide content is high, the polarity of the dispersion stabilizer may be stronger. When the dispersion stabilizer with a high ethylene oxide content is applied to a polymer polyol, it may have a low affinity with non-polar polymer particles and thus a distance between polymer particles may increase. On the other hand, when the dispersion stabilizer with a low ethylene oxide content is applied to a polymer polyol, it may have a high affinity with polymer particles and thus a distance between polymer particles may decrease and aggregation may occur. Depending on the application, when the polarity of the dispersion stabilizer is very high, it may be applied as a hard polymer polyol dispersion stabilizer.

The first polyol may have a lower OHV and a lower ethylene oxide proportion at a chain end, compared to the second polyol. Since the first polyol may have high functionality, a binding strength between the dispersion stabilizer and the vinyl-based polymer may be improved. Accordingly, the dispersion stabilizer to which the first polyol is introduced may improve dispersion stability of the vinyl-based polymer in the polymer polyol.

The first polyol may have an OHV of 5 to 50 mgKOH/g, for example, 5 mgKOH/g, 6 mgKOH/g, 7 mgKOH/g, 8 mgKOH/g, 9 mgKOH/g, 10 mgKOH/g, 11 mgKOH/g, 12 mgKOH/g, 13 mgKOH/g, 14 mgKOH/g, 15 mgKOH/g, 16 mgKOH/g, 17 mgKOH/g, 18 mgKOH/g, 19 mgKOH/g, 20 mgKOH/g, 21 mgKOH/g, 22 mgKOH/g, 23 mgKOH/g, 24 mgKOH/g, 25 mgKOH/g, 26 mgKOH/g, 27 mgKOH/g, 28 mgKOH/g, 29 mgKOH/g, 30 mgKOH/g, 31 mgKOH/g, 32 mgKOH/g, 33 mgKOH/g, 34 mgKOH/g, 35 mgKOH/g, 36 mgKOH/g, 37 mgKOH/g, 38 mgKOH/g, 39 mgKOH/g, 40 mgKOH/g, 41 mgKOH/g, 42 mgKOH/g, 43 mgKOH/g, 44 mgKOH/g, 45 mgKOH/g, 46 mgKOH/g, 47 mgKOH/g, 48 mgKOH/g, 49 mgKOH/g, 50 mgKOH/g, or a value between two OHVs thereof. When the OHV of the first polyol satisfies the above range, the balance of the dispersion stability improvement effect and linearity of the polymer polyol dispersion stabilizer may be maintained.

The first polyol may have an ethylene oxide content of less than 20 wt %, for example, 1 wt %, 2.5 wt %, 5 wt %, 7.5 wt %, 10 wt %, 12.5 wt %, 15 wt %, 17.5 wt %, 19.9 wt %, or may be in the range of two values thereof. When the ethylene oxide content of the first polyol satisfies the above range, the polarity of the polymer polyol dispersion stabilizer may be adjusted to have excellent dispersion stability.

The second polyol may have a relatively higher OHV and a higher ethylene oxide proportion at a chain end, compared to the first polyol. The second polyol may reinforce the linearity of the polymer polyol dispersion stabilizer. As a result, the dispersion stabilizer may have excellent dispersion stability in terms of a low viscosity. The second polyol may have an OHV of 50 to 100 mgKOH/g, for example, 50 mgKOH/g, 51 mgKOH/g, 52 mgKOH/g, 53 mgKOH/g, 54 mgKOH/g, 55 mgKOH/g, 56 mgKOH/g, 57 mgKOH/g, 58 mgKOH/g, 59 mgKOH/g, 60 mgKOH/g, 61 mgKOH/g, 62 mgKOH/g, 63 mgKOH/g, 64 mgKOH/g, 65 mgKOH/g, 66 mgKOH/g, 67 mgKOH/g, 68 mgKOH/g, 69 mgKOH/g, 70 mgKOH/g, 71 mgKOH/g, 72 mgKOH/g, 73 mgKOH/g, 74 mgKOH/g, 75 mgKOH/g, 76 mgKOH/g, 77 mgKOH/g, 78 mgKOH/g, 79 mgKOH/g, 80 mgKOH/g, 81 mgKOH/g, 82 mgKOH/g, 83 mgKOH/g, 84 mgKOH/g, 85 mgKOH/g, 86 mgKOH/g, 87 mgKOH/g, 88 mgKOH/g, 89 mgKOH/g, 90 mgKOH/g, 91 mgKOH/g, 92 mgKOH/g, 93 mgKOH/g, 94 mgKOH/g, 95 mgKOH/g, 96 mgKOH/g, 97 mgKOH/g, 98 mgKOH/g, 99 mgKOH/g, 100 mgKOH/g, or a value between two OHVs thereof. When the OHV of the second polyol satisfies the above range, the balance of the dispersion stability improvement effect and linearity of the polymer polyol dispersion stabilizer may be maintained.

The second polyol may have an ethylene oxide content of 20 wt % or more, for example, 20 wt %, 22.5 wt %, 25 wt %, 27.5 wt %, 30 wt %, 32.5 wt %, 35 wt %, 37.5 wt %, 40 wt %, 42.5 wt %, 45 wt %, 47.5 wt %, 50 wt %, 52.5 wt %, 55 wt %, 57.5 wt %, 60 wt %, 62.5 wt %, 65 wt %, 67.5 wt %, 70 wt %, 72.5 wt %, 75 wt %, 77.5 wt %, 80 wt %, or may be in the range of two values thereof. When the ethylene oxide content of the second polyol satisfies the above range, the polarity of the polymer polyol dispersion stabilizer may be adjusted to have excellent dispersion stability.

In one example, the difference in OHV between the first polyol and the second polyol may be 5 mgKOH/g or more, for example, 5 mgKOH/g, 6 mgKOH/g, 7 mgKOH/g, 8 mgKOH/g, 9 mgKOH/g, 10 mgKOH/g, 11 mgKOH/g, 12 mgKOH/g, 13 mgKOH/g, 14 mgKOH/g, 15 mgKOH/g, 16 mgKOH/g, 17 mgKOH/g, 18 mgKOH/g, 19 mgKOH/g, 20 mgKOH/g, 21 mgKOH/g, 22 mgKOH/g, 23 mgKOH/g, 24 mgKOH/g, 25 mgKOH/g, 26 mgKOH/g, 27 mgKOH/g, 28 mgKOH/g, 29 mgKOH/g, 30 mgKOH/g, 31 mgKOH/g, 32 mgKOH/g, 33 mgKOH/g, 34 mgKOH/g, 35 mgKOH/g, 36 mgKOH/g, 37 mgKOH/g, 38 mgKOH/g, 39 mgKOH/g, 40 mgKOH/g, or may be in the range between two values thereof. When the difference in OHV between the first polyol and the second polyol satisfies the above range, not only the stiffness of the chain structure of the polymer polyol dispersion stabilizer may be improved, but also a low viscosity and excellent dispersion stability, which are in a trade-off relationship, may be realized at the same time due to excellent binding strength with the vinyl-based polymer, but the present invention is not limited thereto.

In one embodiment, the difference in ethylene oxide content between the first polyol and the second polyol may be 10 wt % or more, for example, 10 wt %, 12.5 wt %, 15 wt %, 17.5 wt %, 20 wt %, 22.5 wt %, 25 wt %, 27.5 wt %, 30 wt %, 32.5 wt %, 35 wt %, 37.5 wt %, 40 wt %, 42.5 wt %, 45 wt %, 47.5 wt %, 50 wt %, 52.5 wt %, 55 wt %, 57.5 wt %, 60 wt %, or may be in the range between two values thereof. When the difference in ethylene oxide content between the first polyol and the second polyol satisfies the above range, both of a low viscosity and dispersion stability, which are in a trade-off relationship, may be improved by adjusting the polarity of the polymer polyol dispersion stabilizer, but the present invention is not limited thereto.

On the other hand, the reactive unsaturated compound may be one or more selected from the group consisting of maleic acid, fumaric acid, maleic anhydride, itaconic acid, citraconic acid, and citraconic anhydride, but the present invention is not limited thereto.

In another example, based on a total of 100 parts by weight of the first polyol and the second polyol, the content of a reactive unsaturated compound may have 1 to 5 parts by weight, for example, 1 part by weight, 1.5 parts by weight, 2 parts by weight, 2.5 parts by weight, 3 parts by weight, 3.5 parts by weight, 4 parts by weight, 4.5 parts by weight, 5 parts by weight, or in a range between two values thereof, but the present invention is not limited thereto. When the dispersion stabilizer prepared by introducing a small amount of reactive unsaturated compound to the polyol is used, the dispersion stability of the solid contents in the preparation of a polymer polyol may be improved. As a result, it is possible to improve the physical properties of polyurethane using a polymer polyol which is prepared with a low viscosity and a high content of solid contents.

The dispersion stabilizer may be prepared by reacting a first polyol, a second polyol, and a reactive unsaturated compound in the presence of a catalyst. As the catalyst, an inorganic base such as a hydroxide of an alkali metal or an alkaline earth metal; a weak acid salt of an alkali metal or an alkaline earth metal; an organic base such as quaternary ammonium hydroxide, 4-dimethylaminopyridine, 4-pyrrolidinopyridine, or imidazole; an acid such as hydrochloric acid, sulfuric acid, or phosphoric acid; or an organic tin compound such as dibutyltindilaurate, dibutyltindiacetate, dibutyltindioctoate, dibutyltindibutoxide, dibutyl tindimethoxide, tindilaurate, tindiacetate, tindioctoate, tin 2-ethylhexanoate, tindibutoxide, or tindimethoxide may be used, but the present invention is not limited thereto.

For the above-described reaction, for example, a reaction temperature suitable for the preparation of the dispersion stabilizer may be 80 to 150° C. The reaction may be carried out in a reactor capable of performing stirring and pressurization.

The viscosity (at 25° C.) of the dispersion stabilizer may be 2,500 to 7,500 cps, for example, 2,500 cps, 2,750 cps, 3,000 cps, 3,250 cps, 3,500 cps, 3,750 cps, 4,000 cps, 4,250 cps, 4,500 cps, 4,750 cps, 5,000 cps, 5,250 cps, 5,500 cps, 5,750 cps, 6,000 cps, 6,250 cps, 6,500 cps, 6,750 cps, 7,000 cps, 7,250 cps, 7,500 cps, or may be in the range between two values thereof, but the present invention is not limited thereto. When the viscosity of the dispersion stabilizer satisfies the above range, the viscosity of a polymer polyol may be reduced, thereby improving the production efficiency during the manufacturing of a product.

As the dispersion stabilizer uses two types of polyols having a large difference in functional group and polarity, it may have an excellent binding strength with a vinyl-based polymer and an excellent steric stability even with a relatively short chain length.

In addition, the dispersion stabilizer may have excellent dispersion stability and high linearity, so it may be used for polymer polyol preparation without a need to apply a separate linearity reinforcement process.

Polymer Polyol

A polymer polyol according to another aspect may include the above-described polymer polyol dispersion stabilizer; a polymer derived from an ethylenically unsaturated monomer; and a base polyol.

In one example, the polymer polyol may be prepared by polymerizing one or more ethylenically unsaturated monomers dissolved in the base polyol using a radical initiator. As a result, the polymer polyol may be prepared in the form in which polymer particles derived from an ethylenically unsaturated monomer are stably dispersed in a liquid base polyol. A polyurethane foam prepared using such a polymer polyol may have excellent mechanical properties and excellent air permeability.

As the radical initiator, an organic peroxide-based initiator such as t-butylperoxy-2-ethylhexanoate, t-butyl perpivalate, t-amylperoctoate, 2,5-dimethyl-hexane-2,5-di-per-2-ethylhexoate, t-butylperneodecanoate, or t-butylperbenzoate; or an azo-based initiator such as azobisisobutyronitrile (AIBN), or azobismethylbutyronitrile (AMBN) may be used. The content of the initiator may be 0.1 to 2.5 parts by weight based on a total of 100 parts by weight of the monomer. When the initiator content is out of the above range, a polymerization rate and dispersion stability may be reduced, but the present invention is not limited thereto.

The polymer polyol dispersion stabilizer may be used in preparation of a polymer polyol with a low viscosity and a high content of solid contents due to excellent dispersion stability for polymer particles derived from an ethylenically unsaturated monomer and excellent affinity with a base polyol.

The ethylenically unsaturated monomer may be at least one selected from the group consisting of an aromatic vinyl monomer and a vinyl cyan-based monomer. For example, the ethylenically unsaturated monomer may be one type of aromatic vinyl monomer, two or more types of aromatic vinyl monomers, or a mixture of one or more types of aromatic vinyl monomer and one or more types of vinyl cyan-based monomers, but the present invention is not limited thereto. In this case, the polymer may be non-polar.

The aromatic vinyl monomer may be one or more selected from the group consisting of styrene, α-methylstyrene, 2-methylstyrene, 3-methylstyrene, 4-methyl styrene, 2,4-dimethylstyrene, 2,4-diisopropylstyrene, 4-propylstyrene, 4-cyclohexylstyrene, 4-(p-methylphenyl)styrene, 5-tert-butyl-2-methylstyrene, tert-butoxystyrene, 2-tert-butylstyrene, 3-tert-butylstyrene, 4-tert-butylstyrene, N,N-dimethyl-aminoethylstyrene, 1-vinyl-5-hexylnaphthalene, 1-vinylnaphthalene, divinylnaphthalene, divinylbenzene, trivinylbenzene, vinylbenzyldimethylamine, (4-vinylbenzyl)dimethylaminoethylether, vinylpyridine, vinylxylene, diphenylethylene, diphenylethylene having a tertiary amine, styrene functionalized with a primary, secondary or tertiary amine, and a derivative thereof, but the present invention is not limited thereto.

The vinyl cyan-based monomer may be one or more selected from the group consisting of acrylonitrile, methacrylonitrile, ethacrylonitrile, and a derivative thereof, but the present invention is not limited thereto.

The aromatic vinyl monomer and the vinyl cyan-based monomer may be polymerized in a weight ratio of 100:5 to 75. For example, based on 100 parts by weight of the aromatic vinyl monomer, the content of the vinyl cyan-based monomer may be 5 parts by weight, 10 parts by weight, 15 parts by weight, 20 parts by weight, 25 parts by weight, 30 parts by weight, 35 parts by weight, 40 parts by weight, 45 parts by weight, 50 parts by weight, 55 parts by weight, 60 parts by weight, 65 parts by weight, 70 parts by weight, 75 parts by weight, or may be in the range between two values thereof, but the present invention is not limited thereto. When the content of the vinyl cyan-based monomer is out of the above range, an unnecessary color may be exhibited, dispersion stability may be lowered, viscosity may excessively increase, or scorching may occur in polyurethane.

The average particle diameter of the polymer derived from the ethylenically unsaturated monomer may be 0.5 to 3 μm, for example, 0.5 μm, 0.6 μm, 0.7 μm, 0.8 μm, 0.9 μm, 1.0 μm, 1.1 μm, 1.2 μm, 1.3 μm, 1.4 μm, 1.5 μm, 1.6 μm, 1.7 μm, 1.8 μm, 1.9 μm, 2.0 μm, 2.1 μm, 2.2 μm, 2.3 μm, 2.4 μm, 2.5 μm, 2.6 μm, 2.7 μm, 2.8 μm, 2.9 μm, 3.0 μm, or in a range between two values thereof, but the present invention is not limited thereto. The polymer polyol may be one in which polymer particles having the above-described average particle diameter are dispersed on a liquid base polyol without aggregation.

The base polyol may be a polyether polyol prepared by addition-polymerization of an alkylene oxide such as an ethylene oxide, propylene oxide, or butylene oxide to a multivalent alcohol such as propylene glycol or glycerin, but there is no limitation as long as it is a polyol suitable for polymer polyol preparation. The OHV of the base polyol may be 5 to 100 mgKOH/g, for example, 5 mgKOH/g, 7.5 mgKOH/g, 10 mgKOH/g, 12.5 mgKOH/g, 15 mgKOH/g, 17.5 mgKOH/g, 20 mgKOH/g, 22.5 mgKOH/g, 25 mgKOH/g, 27.5 mgKOH/g, 30 mgKOH/g, 32.5 mgKOH/g, 35 mgKOH/g, 37.5 mgKOH/g, 40 mgKOH/g, 42.5 mgKOH/g, 45 mgKOH/g, 47.5 mgKOH/g, 50 mgKOH/g, 52.5 mgKOH/g, 55 mgKOH/g, 57.5 mgKOH/g, 60 mgKOH/g, 62.5 mgKOH/g, 65 mgKOH/g, 67.5 mgKOH/g, 70 mgKOH/g, 72.5 mgKOH/g, 75 mgKOH/g, 77.5 mgKOH/g, 80 mgKOH/g, 82.5 mgKOH/g, 85 mgKOH/g, 87.5 mgKOH/g, 90 mgKOH/g, 92.5 mgKOH/g, 95 mgKOH/g, 97.5 mgKOH/g, 100 mgKOH/g, or in a range between two values thereof, but the present invention is not limited thereto. When the OHV of the base polyol is out of the above range, polymer polyol aggregation may occur.

The viscosity (at 25° C.) of the base polyol may be 200 to 10,000 cps, for example, 200 cps, 225 cps, 250 cps, 275 cps, 300 cps, 325 cps, 350 cps, 375 cps, 400 cps, 425 cps, 450 cps, 475 cps, 500 cps, 525 cps, 550 cps, 575 cps, 600 cps, 625 cps, 650 cps, 675 cps, 700 cps, 725 cps, 750 cps, 775 cps, 800 cps, 825 cps, 850 cps, 875 cps, 900 cps, 925 cps, 950 cps, 975 cps, 1000 cps, 1,100 cps, 1,200 cps, 1,300 cps, 1,400 cps, 1,500 cps, 1,600 cps, 1,700 cps, 1,800 cps, 1,900 cps, 2,000 cps, 2,100 cps, 2,200 cps, 2,300 cps, 2,400 cps, 2,500 cps, 2,600 cps, 2,700 cps, 2,800 cps, 2,900 cps, 3,000 cps, 3,100 cps, 3,200 cps, 3,300 cps, 3,400 cps, 3,500 cps, 3,600 cps, 3,700 cps, 3,800 cps, 3,900 cps, 4,000 cps, 4,100 cps, 4,200 cps, 4,300 cps, 4,400 cps, 4,500 cps, 4,600 cps, 4,700 cps, 4,800 cps, 4,900 cps, 5,000 cps, 5,100 cps, 5,200 cps, 5,300 cps, 5,400 cps, 5,500 cps, 5,600 cps, 5,700 cps, 5,800 cps, 5,900 cps, 6,000 cps, 6,100 cps, 6,200 cps, 6,300 cps, 6,400 cps, 6,500 cps, 6,600 cps, 6,700 cps, 6,800 cps, 6,900 cps, 7,000 cps, 7,100 cps, 7,200 cps, 7,300 cps, 7,400 cps, 7,500 cps, 7,600 cps, 7,700 cps, 7,800 cps, 7,900 cps, 8,000 cps, 8,100 cps, 8,200 cps, 8,300 cps, 8,400 cps, 8,500 cps, 8,600 cps, 8,700 cps, 8,800 cps, 8,900 cps, 9,000 cps, 9,100 cps, 9,200 cps, 9,300 cps, 9,400 cps, 9,500 cps, 9,600 cps, 9,700 cps, 9,800 cps, 9,900 cps, 10,000 cps, or in a range between two values thereof, but the present invention is not limited thereto. When the viscosity of the base polyol is out of the above range, the viscosity rapidly increases during the polymer polyol preparation, so that the content of solid contents may not increase, or it may be difficult to prepare polyurethane.

Meanwhile, in one embodiment, in the polymer polyol preparation, a molecular weight adjustor or diluent may be further included. For example, the molecular weight adjustor or diluent may be an alcohol such as methanol, ethanol, isopropanol, or butanol; a mercaptan such as thiol ethane, thiol heptane, thiol octane, or thiol dodecane; toluene, ethyl benzene, or xylene, but the present invention is not limited thereto.

In another example, the content of solid contents of the polymer polyol may be 10 to 70 wt %, for example, 10 wt %, 12.5 wt %, 15 wt %, 17.5 wt %, 20 wt %, 22.5 wt %, 25 wt %, 27.5 wt %, 30 wt %, 32.5 wt %, 35 wt %, 37.5 wt %, 40 wt %, 42.5 wt %, 45 wt %, 47.5 wt %, 50 wt %, 52.5 wt %, 55 wt %, 57.5 wt %, 60 wt %, 62.5 wt %, 65 wt %, 67.5 wt %, 70 wt %, or in a range between two values thereof, but the present invention is not limited thereto. When the content of solid contents is out of the above range, the physical properties of the final product may be poor, or polymer polyol aggregation may occur.

Meanwhile, the viscosity (at 25° C.) of the polymer polyol may be 500 to 25,000 cps, for example, 500 cps, 750 cps, 1,000 cps, 1,250 cps, 1,500 cps, 1,750 cps, 2,000 cps, 2,250 cps, 2,500 cps, 2,750 cps, 3,000 cps, 3,250 cps, 3,500 cps, 3,750 cps, 4,000 cps, 4,250 cps, 4,500 cps, 4,750 cps, 5,000 cps, 5,250 cps, 5,500 cps, 5,750 cps, 6,000 cps, 6,250 cps, 6,500 cps, 6,750 cps, 7,000 cps, 7,250 cps, 7,500 cps, 7,750 cps, 8,000 cps, 8,250 cps, 8,500 cps, 8,750 cps, 9,000 cps, 9,250 cps, 9,500 cps, 9,750 cps, 10,000 cps, 10,500 cps, 11,000 cps, 11,500 cps, 12,000 cps, 12,500 cps, 13,000 cps, 13,500 cps, 14,000 cps, 14,500 cps, 15,000 cps, 15,500 cps, 16,000 cps, 16,500 cps, 17,000 cps, 17,500 cps, 18,000 cps, 18,500 cps, 19,000 cps, 19,500 cps, 20,000 cps, 20,500 cps, 21,000 cps, 21,500 cps, 22,000 cps, 22,500 cps, 23,000 cps, 23,500 cps, 24,000 cps, 24,500 cps, 25,000 cps, or in a range between two values thereof, but the present invention is not limited thereto. When the viscosity is out of the above range, aggregation may occur, or miscibility with an isocyanate may be poor and thus it may be impossible to prepare a product.

In addition, the polymer polyol may be used by replacing a part or all of the base polyol in a known polyurethane system. The polyurethane system may further include additives such as a foam stabilizer, a catalyst, a foaming agent, and a crosslinking agent, other than the polyol. Such additives may be known in the art.

The polymer polyol may be used in preparation of a polyurethane foam. When the polymer polyol is applied, mechanical properties, air permeability, and the like may be improved compared to when using a general polyol.

The polyurethan foam prepared using the polymer polyol may improve factors affecting the emotional quality of the final product, such as elasticity, stress relaxation, and a vibration transmission rate, and thus may be suitable for imparting comfort.

Method of Preparing Polymer Polyol

A method of preparing a polymer polyol according to still another aspect may include: (a) preparing a first mixture by mixing the above-described polymer polyol dispersion stabilizer, an ethylenically unsaturated monomer, an initiator, and a base polyol; (b) preparing a second mixture by mixing a base polyol and a diluent; and (c) adding the first mixture to the second mixture and polymerizing the resulting mixture. (a) and (b) may be performed simultaneously or sequentially, and an order is not limited.

Characteristics of the polymer polyol dispersion stabilizer, the ethylenically unsaturated monomer, the initiator, and the base polyols are the same as described above.

In (a), a first mixture may be prepared by mixing a monomer, an initiator, a dispersion stabilizer, and a polyol. In (a), the ethylenically unsaturated monomer may be dissolved in the base polyol.

In the first mixture, the content of the polymer polyol dispersion stabilizer may be 1 to 10 parts by weight based on 100 parts by weight of the ethylenically unsaturated monomer, but the present invention is not limited thereto. For example, based on 100 parts by weight of the ethylenically unsaturated monomer, the content of the polymer polyol dispersion stabilizer may be 1 part by weight, 1.5 parts by weight, 2 parts by weight, 2.5 parts by weight, 3 parts by weight, 3.5 parts by weight, 4 parts by weight, 4.5 parts by weight, 5 parts by weight, 5.5 parts by weight, 6 parts by weight, 6.5 parts by weight, 7 parts by weight, 7.5 parts by weight, 8 parts by weight, 8.5 parts by weight, 9 parts by weight, 9.5 parts by weight, 10 parts by weight, or in a range between two values thereof. When the content is out of the above range, the aggregation of polymer particles may occur, or the content of solid contents may not reach a required level.

(b) may be a step of preparing polymer polyol synthesis by mixing some of the raw materials and increasing the temperature of a reactor. For example, (b) may be performed by mixing the remainder of polyol except the polyol used in (a) with the diluent.

The weight ratio of each of the polyols used in (a) and (b) may be 1 to 5:1. For example, when, in (a), the content of the polyol used may be 1 part by weight, 1.5 parts by weight, 2 parts by weight, 2.5 parts by weight, 3 parts by weight, 3.5 parts by weight, 4 parts by weight, 4.5 parts by weight, 5 parts by weight, or in a range between two values thereof, in (b), the content of the polyol used may be 1 part by weight, but the present invention is not limited thereto.

(c) may be a step of performing polymerization by adding the first mixture in which the ethylenically unsaturated monomer is dissolved in the base polyol to the second mixture in which the base polyol is mixed with the diluent. (c) may be performed at 80 to 150° C., for example, 80° C., 85° C., 90° C., 95° C., 100° C., 105° C., 110° C., 115° C., 120° C., 125° C., 130° C., 135° C., 140° C., 145° C., 150° C., or in a range between two values thereof, but the present invention is not limited thereto. (c) may be performed while stirring continuously.

In (c), the addition of the first mixture may continue for 1 to 30 hours, but the present invention is not limited thereto. When the addition is excessively fast, the dispersion stability of polymer particles may be degraded, and when the addition may be excessively slow, it may be disadvantageous economically.

After the polymerization in (c), the resulting product may be aged at a temperature, which is the same as or higher the polymerization temperature, for 1 to hours, but the present invention is not limited thereto. Through such an aging process, polymer particles may be stably dispersed in the polyol.

After the aging process, a degassing process for removing an unreacted monomer and other additives may be performed. Such a degassing process may be applied to a known method.

Hereinafter, examples in the specification will be described in further detail. However, the following experimental results are only representative experimental results among the above examples, and the scope and contents of the specification may not be interpreted as being reduced or limited by the examples. Each effect of the various embodiments of the specification, which is not explicitly presented below is specifically described in the corresponding section.

Example 1

500 parts by weight of a first polyol which has a hydroxyl value (OHV) of 38 mgKOH/g and 8 wt % ethylene oxide (EO), 500 parts by weight of a second polyol which has an OHV of 56 mgKOH/g and 50 wt % ethylene oxide, 35 parts by weight of maleic anhydride, and 1 part by weight of sodium hydroxide were put into a reactor. A dispersion stabilizer was prepared by stirring under the conditions of 130° C. and 200 rpm for 14 hours. The viscosity (at 25° C.) of the prepared dispersion stabilizer was measured to be 4,800 cps.

515.8 parts by weight of styrene and 221.1 parts by weight of acrylonitrile as monomers, 11 parts by weight of azobisisobutyronitrile as an initiator, and 55.2 parts by weight of the dispersion stabilizer were dispersed completely in a continuous feed tank equipped with an agitator. To the continuous feed tank, 645.4 parts by weight of a base polyol which has an OHV of 56 mgKOH/g and a viscosity (at 25° C.) of 500 cps were added, and stirred for 5 minutes, thereby preparing a continuous feed mixture.

200 parts by weight of a base polyol which has an OHV of 56 mgKOH/g and a viscosity (at 25° C.) of 500 cps was put into a batch-type reactor equipped with an agitator. 245.6 parts by weight of ethyl benzene was additionally put into the reactor and completely dissolved. While stirring at a speed of 250 rpm, the temperature of the reaction product was raised to 120° C. over an hour. When the internal temperature of the reactor reached 120° C., the continuous feed mixture was continuously introduced at the same rate over 5 hours. The temperature and stirring condition of the reactor were maintained at 120° C. and 250 rpm. After the addition of the continuous feed mixture was completed, the temperature was raised to 130° C. and aged for 2 hours.

A polymer polyol was obtained by transferring the polymer that had been polymerized and aged to a purification tank and degassed under reduced pressure for 20 hours at 120° C. to remove ethylbenzene dissolved in the polymer.

Example 2

A polymer polyol was prepared by the same method as in Example 1, except that 73.7 parts by weight of a dispersion stabilizer, 687.8 parts by weight of styrene, 294.8 parts by weight of acrylonitrile, 14.7 parts by weight of azobisisobutyronitrile, and 381.4 parts by weight of a base polyol were added in the preparation of a continuous feed mixture.

Example 3

A polymer polyol was prepared by the same method as in Example 1, except that a base polyol which has an OHV of 34 mgKOH/g and a viscosity (at 25° C.) of 840 cps was used, and 49.1 parts by weight of a dispersion stabilizer, 360.3 parts by weight of styrene, 294.8 parts by weight of acrylonitrile, 9.8 parts by weight of azobisisobutyronitrile, and 733.4 parts by weight of the base polyol were added in the preparation of a continuous feed mixture.

Example 4

A polymer polyol was prepared by the same method as in Example 1, except that a base polyol which has an OHV of 24 mgKOH/g and a viscosity (at 25° C.) of 1,450 cps was used, and 49.1 parts by weight of a dispersion stabilizer, 360.3 parts by weight of styrene, 294.8 parts by weight of acrylonitrile, 9.8 parts by weight of azobisisobutyronitrile, and 733.4 parts by weight of the base polyol were added in the preparation of a continuous feed mixture.

Comparative Example 1

A polymer polyol was prepared by the same method as in Example 1, except that a dispersion stabilizer to which a linearity reinforcement process is applied, which has a viscosity (at 25° C.) of 8,000 cps applied to a conventional polymer polyol and is prepared with one type of a polyol was used.

Comparative Example 2

A polymer polyol was prepared by the same method as in Example 2, except that the dispersion stabilizer of Comparative Example 1 was used.

Comparative Example 3

A polymer polyol was prepared by the same method as in Example 3, except that the dispersion stabilizer of Comparative Example 1 was used.

Comparative Example 4

A polymer polyol was prepared by the same method as in Example 4, except that the dispersion stabilizer of Comparative Example 1 was used.

Comparative Example 5

1,000 parts by weight of a first polyol having an OHV of 38 mgKOH/g and 8 wt % ethylene oxide, 35 parts by weight of maleic anhydride, and 1 part by weight of sodium hydroxide were put into a reactor. A dispersion stabilizer was prepared by stirring the resulting mixture under conditions such as 130° C. and 200 rpm for 14 hours. The viscosity (at 25° C.) of the prepared stabilizer was measured to be 8,200 cps.

A polymer polyol was prepared by the same method as in Example 1, except that the dispersion stabilizer was used.

Comparative Example 6

500 parts by weight of a first polyol having an OHV of 38 mgKOH/g and 8 wt % ethylene oxide, 35 parts by weight of maleic anhydride, and 1 part by weight of sodium hydroxide were put into a reactor. A dispersion stabilizer was prepared by stirring the resulting mixture under conditions such as 130° C. and 200 rpm for 14 hours. The viscosity (at 25° C.) of the prepared stabilizer was measured to be 5,100 cps.

A polymer polyol was prepared by the same method as in Example 1, except that the dispersion stabilizer was used.

Comparative Example 7

1,000 parts by weight of a second polyol having an OHV of 56 mgKOH/g and wt % ethylene oxide, 35 parts by weight of maleic anhydride, and 1 part by weight of sodium hydroxide were put into a reactor. A dispersion stabilizer was prepared by stirring the resulting mixture under conditions such as 130° C. and 200 rpm for 14 hours. The viscosity (at 25° C.) of the prepared stabilizer was measured to be 5,200 cps.

A polymer polyol was prepared by the same method as in Example 1, except that the dispersion stabilizer was used.

Comparative Example 8

500 parts by weight of a first polyol having an OHV of 38 mgKOH/g and 8 wt % ethylene oxide, 500 parts by weight of a second polyol having an OHV of 56 mgKOH/g and 0 wt % ethylene oxide, 35 parts by weight of maleic anhydrous, and 1 part by weight of sodium hydroxide were put into a reactor. A dispersion stabilizer was prepared by stirring the resulting mixture under conditions such as 130° C. and 200 rpm for 14 hours. The viscosity (at 25° C.) of the prepared dispersion stabilizer was measured to be 5,000 cps.

A polymer polyol was prepared by the same method as in Example 1, except that the dispersion stabilizer was used.

Comparative Example 9

500 parts by weight of a first polyol having an OHV of 56 mgKOH/g and 8 wt % ethylene oxide, 500 parts by weight of a second polyol having an OHV of 56 mgKOH/g and 50 wt % ethylene oxide, 35 parts by weight of maleic anhydride, and 1 part by weight of sodium hydroxide were put into a reactor. A dispersion stabilizer was prepared by stirring the resulting mixture under conditions such as 130° C. and 200 rpm for 14 hours. The viscosity (at 25° C.) of the prepared dispersion stabilizer was measured to be 5,000 cps.

A polymer polyol was prepared by the same method as in Example 1, except that the dispersion stabilizer was used.

The characteristics of the dispersion stabilizers used in Examples and Comparative Examples are shown in Table 1 below, and the characteristics of the products prepared in Examples and Comparative Examples are shown in Table 2 below.

TABLE 1

| — | First polyol | | Second polyol | | Viscosity |
|---|---|---|---|---|---|
| | OHV (mgKOH/g) | EO content (wt %) | OHV (mgKOH/g) | EO content (wt %) | of dispersion (cps @ 25° C.) |
| Example 1 | 38 | 8 | 56 | 50 | 4,800 |
| Example 2 | 38 | 8 | 56 | 50 | 4,800 |
| Example 3 | 38 | 8 | 56 | 50 | 4,800 |
| Example 4 | 38 | 8 | 56 | 50 | 4,800 |
| Comparative Example 1 | — | — | — | — | 8,000 |
| Comparative Example 2 | — | — | — | — | 8,000 |
| Comparative Example 3 | — | — | — | — | 8,000 |
| Comparative Example 4 | — | — | — | — | 8,000 |
| Comparative Example 5 | 38 | 8 | — | — | 8,200 |
| Comparative Example 6 | 38 | 8 | — | — | 5,100 |
| Comparative Example 7 | 56 | 50 | — | — | 5,200 |
| Comparative Example 8 | 38 | 8 | 56 | 0 | 5,000 |
| Comparative Example 9 | 56 | 8 | 56 | 50 | 5,000 |

TABLE 2

| — | Base polyol OHV (mgKOH/g) | Viscosity of base polyol cps @ 25° C. | Quality of POP | Solid content of POP | Viscosity of POP (cps @ 25° C.) | Average particle diameter of POP (µm) |
|---|---|---|---|---|---|---|
| Example 1 | 56 | 500 | Good | 45.1 | 3,200 | 1.4 |
| Example 2 | 56 | 500 | Good | 60.2 | 12,000 | 1.4 |
| Example 3 | 34 | 840 | Good | 40.3 | 3,700 | 1.3 |
| Example 4 | 24 | 1,450 | Good | 40.1 | 5,850 | 1.3 |
| Comparative Example 1 | 56 | 500 | Good | 45.4 | 4,800 | 1.2 |
| Comparative Example 2 | 56 | 500 | Good | 60.0 | 34,000 | 1.2 |
| Comparative Example 3 | 34 | 840 | Good | 40.3 | 5,500 | 1.2 |
| Comparative Example 4 | 24 | 1,450 | Good | 40.2 | 12,000 | 1.2 |
| Comparative Example 5 | 56 | 500 | Bad | 44.9 | 4,900 | 3.8 |
| Comparative Example 6 | 56 | 500 | Aggregated | | Not assessable | |
| Comparative Example 7 | 56 | 500 | Aggregated | | Not assessable | |
| Comparative Example 8 | 56 | 500 | Aggregated | | Not assessable | |
| Comparative Example 9 | 56 | 500 | Aggregated | | Not assessable | |

Referring to Tables 1 and 2, it can be confirmed that polymer polyols to which the dispersion stabilizers of Examples 1 to 4 were applied had lower viscosities and identical qualities than those of Comparative Examples 1 to 4 to which the conventional dispersion stabilizer was applied without a separate linearization reinforcement process.

On the other hand, in the case the polyols of Comparative Examples 5 to 7 in which the first polyol or the second polyol was separately prepared and a separate linearization process did not undergo, the qualities of polymer polyols were poor or aggregation occurred, and therefore it was impossible to use these polyols.

In addition, even when two types of polyols were used in the preparation of a dispersion stabilizer, the qualities of polymer polyols of Comparative Examples 8 and 9 with a small difference in functional group or ethylene oxide content range were poor and thus aggregation occurred.

Experimental Example 1

The polymer polyols prepared in Examples 3 and 4 were reacted with 4,4'-methylene di-bisphenyl diisocyanate (MDI) and applied to a flexible polyurethane foam, and their qualities were examined. The characteristics of the flexible polyurethane foam are shown in Table 3 below. As a system polyol, a flexible system polyol prepared by mixing a polymer polyol, a base polyol, a foam stabilizer, a catalyst, and water was used.

15

16

TABLE 3

| — | Example 3 | Example 4 |
|---|---|---|
| System polyol | 100 | 100 |
| MDI | 50 | 50 |
| Foam density (g/L) | 65.2 | 65.2 |
| 25% ILD (kgf/314 cm$^2$) | 28.3 | 25.7 |
| 65% ILD (kgf/314 cm$^2$) | 86.9 | 80.8 |
| Hysteresis loss (%) | 18.50 | 16.41 |
| Vibration transmission rate (%) | 4.77 | 2.96 |

Indentation load deflection (ILD): A flexible polyurethane foam prepared and formed using the polymer polyol in a mold (size: 300×300×100 mm) was hardened for 1 day at room temperature, and then a force exerted by compressing the foam by vol % or 65 vol % was measured, and the unit was kgf/314 cm$^2$.

Hysteresis loss: measured in accordance with ASTM D3574-05 TEXT X6.

Vibration transmission rate: measured in accordance with MS200-34 4.8. The low measurement value means that vibration is well absorbed.

The polymer polyols to which the dispersion stabilizers of the examples are applied can be stably prepared such that the content of solid contents therein is 60 wt % or more. In addition, such polymer polyols may have a viscosity reduced by 30% or more than that of the conventional polymer polyol. This means that even when the content of solid contents is increased by 4 wt %, such polymer polyols have a lower viscosity than a polymer polyol to which the conventional dispersion stabilizer is applied.

In addition, when the dispersion stabilizers of the examples are applied, the polymer polyols of the examples may have a viscosity equivalent to that of the conventional common polymer polyol even by using a base polyol with a high molecular weight. For example, when the high-molecular-weight polyol is applied as a base polyol, the viscosity (at 25° C.) of a product having 40 wt % solid contents is merely less than 6,000 cps.

According to one aspect, a dispersion stabilizer capable of reducing the viscosity of a polymer polyol (POP) and increasing the content of solid contents can be prepared in a simple process.

The effects of one aspect in the specification are not limited to the above effect, and should be understood to include all effects that can be inferred from the configuration described in the detailed description or claims of the specification.

It should be understood by those of ordinary skill in the art that the above description of the specification is exemplary, and the exemplary embodiments disclosed herein can be easily modified into other specific forms without departing from the technical spirit or essential features of the specification. Therefore, the exemplary embodiments described above should be interpreted as illustrative in all aspects and not restrictive. For example, each component described as a single unit may be implemented in a distributed manner, and components described as being distributed may also be implemented in combined form.

The scope of the present invention is defined by the appended claims and encompasses all modifications and alterations derived from meanings, the scope and equivalents of the appended claims.

What is claimed is:

1. A polymer polyol dispersion stabilizer, which is prepared by reacting
   a first polyol having a hydroxyl value (OHV) of 5 to 50 mgKOH/g and an ethylene oxide content of less than 20 wt %;
   a second polyol having an OHV of 50 to 100 mgKOH/g and an ethylene oxide content of 20 wt % or more; and
   a reactive unsaturated compound having one or more carbon-carbon double bonds and two or more carbon-oxygen double bonds.

2. The polymer polyol dispersion stabilizer of claim 1, wherein the difference in OHV between the first polyol and the second polyol is 5 mgKOH/g or more.

3. The polymer polyol dispersion stabilizer of claim 1, wherein the difference in ethylene oxide content between the first polyol and the second polyol is 10 wt % or more.

4. The polymer polyol dispersion stabilizer of claim 1, wherein the reactive unsaturated compound is one or more selected from the group consisting of maleic acid, fumaric acid, maleic anhydride, itaconic acid, citraconic acid, and citraconic anhydride.

5. The polymer polyol dispersion stabilizer of claim 1, wherein the stabilizer has a viscosity (at 25° C.) of 2,500 to 7,500 cps.

6. A polymer polyol, comprising:
   the polymer polyol dispersion stabilizer of claim 1;
   a polymer derived from an ethylenically unsaturated monomer; and
   a base polyol.

7. The polymer polyol of claim 6, wherein the ethylenically unsaturated monomer is at least one selected from the group consisting of an aromatic vinyl monomer and a vinyl cyan-based monomer.

8. The polymer polyol of claim 6, wherein the content of solid contents is 10 to 70 wt %.

9. The polymer polyol of claim 6, wherein the viscosity (at 25° C.) is 500 to 25,000 cps.

10. A method of preparing a polymer polyol, comprising:
    (a) preparing a first mixture by mixing the polymer polyol dispersion stabilizer of claim 1, an ethylenically unsaturated monomer, an initiator, and a base polyol;
    (b) preparing a second mixture by mixing a base polyol and a diluent; and
    (c) adding the first mixture to the second mixture and polymerizing the resulting mixture.

* * * * *